United States Patent [19]

Aoki et al.

[11] Patent Number: 4,832,400

[45] Date of Patent: May 23, 1989

[54] VEHICLE SEAT WITH LUMBAR SUPPORT DEVICE

[75] Inventors: Akira Aoki; Yoshihiro Mizushima; Toshiya Kuroyanagi, all of Tokyo, Japan

[73] Assignee: Tachi-S Co., Ltd., Tokyo, Japan

[21] Appl. No.: 214,551

[22] Filed: Jun. 29, 1988

[51] Int. Cl.[4] .............................................. A47C 27/00
[52] U.S. Cl. ........................................ 297/284; 297/219
[58] Field of Search ...................... 297/284, 460, 219

[56] References Cited

U.S. PATENT DOCUMENTS

| | | | |
|---|---|---|---|
| 3,874,731 | 4/1975 | Jordan | 297/219 X |
| 4,531,779 | 7/1985 | Hashimoto | 297/284 |
| 4,534,593 | 8/1985 | Ojala | 297/284 |
| 4,550,949 | 11/1985 | Sakamoto | 297/460 X |
| 4,636,000 | 1/1987 | Nishino | 297/284 |
| 4,707,027 | 11/1987 | Horvath et al. | 297/284 |

*Primary Examiner*—Peter A. Aschenbrenner
*Attorney, Agent, or Firm*—Browdy and Neimark

[57] ABSTRACT

A vehicle seat with a lumbar support device which is so constructed that an independent lumbar support cushion member is defined in a cushion member and a trim cover assembly covering such cushion member includes a lumbar support portion, a part of which is formed separate from the surrounding areas of the trim cove assembly, covering the independent lumbar support cushion member. Thus, the lumbar support section of the seat is easily raised or lowered at an increased range, by operation of the lumbar support device.

7 Claims, 4 Drawing Sheets

VEHICLE SEAT WITH LUMBAR SUPPORT DEVICE

BACKGROUND OF THE INVENTION

1. Field of the Invention

The present invention relates to a vehicle seat such as an automotive seat, having a lumbar support device provided therein, and in particular to a structure of a foam cushion member and trim cover assembly in that kind of seat.

2. Description of the Prior Art

With the recent increased technical develpment, the vehicles seats including automotive one have been improved in many ways in consideration of seating preferences and slightly different best seating postures of individual occupant sitting on the seat.

In particular, among various seats with a lumbar support device, two typical types have been found as conventional seat of this kind, for instance: One is a generally known type according to which the lumbar support portion of the seat is adjusted its cushioning effect by the forward and backward movements of the lumbar plate being controlled by the external knob, and the other is known from U.S. Pat. No. 3,973,797 in which the lumbar support portion of cushion member as well as the trim cover assembly thereon are raised or lowered by the pressing means provided within the seat.

However, those prior arts have been found defective in that, the former does not provide a positive supporting function because of its structure directed to the adjustment of hardness of the cushion member for variable cushiony effect, while the latter, although certainly having a sufficient supportive function because of its pressing means, is yet deficient in the facilitation of smooth displacement of the lumbar support portion against the surrounding areas in the seat, which is also the case in the former prior art. This is attributed to the continuous and integral formation of the lumbar support portion with the surrounding areas in the cushion member as well as in the trim cover assembly, and consequently, the lumbar support portion is not so fully raised as it should be by the forward pushing action of the pressing means. Accordingly, those two prior arts remain to have a poor operationability for effective lumbar support adjustments.

SUMMARY OF THE INVENTION

With the above drawbacks of prior art in view, it is therefore a first purpose of the present invention to provide an improved vehicle seat with lumbar support device which allows a full displacement of its lumbar support portion against the surrounding areas in the seat, and provides a sufficient supportive function for the lumbar support portion.

In accomplishment of the purpose, in accordance with the present invention, there is provided an independent lumbar support cushion member which is arranged independently of the other portions of the seat, so that the lumbar support cushion member is bodily slidable forwardly and backwardly in the seat back of the seat, and further provided is a trim cover assembly so formed that it is cut in the boundary line between its central back support portion and a peripheral side portion surrounding the central back support portion, with the upper end of the central back support portion only sewn to the peripheral side portion, thereby allowing the lumbar support portion to move freely and independently of the peripheral side portion in the forward and backward directions. Behind the lumbar support cushion member, arranged is a lumbar plate operatively connected with a pressing mechanism.

Accordingly, the lumbar support portion of the seat is adjustably displaced at a sufficient degree by a pressing and retracting action of a lumbar plate provided internally of the seat back, and as such, the lumbar support adjustment can be effected as fully as expected by an occupant on the seat who controls the raising or lowering of the lumbar support portion of the seat.

It is a second purpose of the present invention to provide an improved arrangement in the abovementioned vehicle seat with lumbar support device, which facilitates the ease of assembling the seat back thereof.

To this end, in accordance with the present invention, the lumbar support section of the trim cover assembly is at its rear side provided with a bag-like container portion. This container portion is adapted for accommodating the foregoing independent lumbar support cushion member therein.

Accordingly, during the assemblage of the seat, the cushion member as well as the trim cover assembly are greatly easy to assemble on the seat frame.

DETAILED DESCRIPTION OF PREFERRED EMBODIMENT OF THE INVENTION

Figure 1:
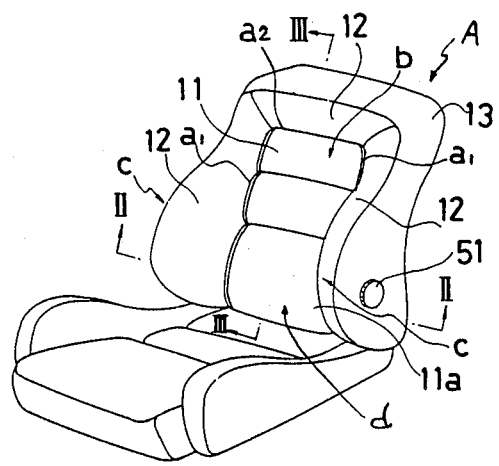
FIG. 1 is a perspective view of a seat in accordance with the present invention.

With reference to FIG. 1, illustrative is a seat on the whole in accordance with the present invention, and with particular reference to a seat back (A) of the seat, there are defined a central back support section (b), a pair of side support sections (c)(c) formed projectingly on the opposite side of the central back support section (b) in a symmetrical right and left relation thereto, as shown, and a lumbar support section (d) arranged at the lower region of the central back support section (b).

The lumbar support section (d), as will be described later, is adjustably raised or lowered from or into the seat back (A) by operating a control knob (51) of a lumbar support device to be explained later, which is provided within the seat back (A), to thereby support the lumbar part of an occupant sitting on the seat at a preferred support position.

In the FIG. 1, designations (11a), (11b), (12), and (13) refer to the partial constituent portions of a trim cover assembly (1) which will be described in details below, (see FIG. 8), the numerals (11b) and (11a), respectively, denoting an upper back support portion and a lumbar support portion, and the numerals (12) and (13) denoting a peripheral bolster portion and a side wall portion, respectively.

Now, referring to FIGS. 2 through 9, a specific description will be made of the present invention.

The seat back (A) is comprised of the trim cover assembly (1) constituting its outer surfaces, and a cushion member (2) covered with the trim cover assembly (1). The cushion member (2) comprises a central back support portion (21), a peripheral side portion (22) surrounding the central back support portion (21), and an independent lumbar support cushion member (21a) formed independently of the cushion member (2). Both cushion member (2) and lumbar support cushion member (21a) are made of a foam such as urethane foam.

It is noted here that the foregoing portions (11b), (11a), (12) and (13) of the trim cover assembly (1) are designed so as to respectively cover the corresponding parts of the cushion member (2), namely, the central back support portion (21, 21a) and peripheral side portion (22) thereof.

Those cushion member (2) and trim cover assembly (1) are secured on a seat frame (3).

Figure 8:
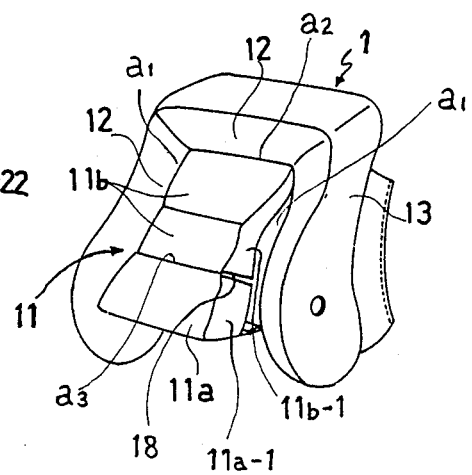
FIG. 8 is a perspective view of the trim cover assembly in accordance with the present invention.

As best shown in FIG. 8, the trim cover assembly (1) consists essentially of a central support area (11) including the upper back support portion (11b) and the lumbar support portion (11a), the aforementioned peripheral bolster portion (12) surrounding the central support area (11), and the side wall portion (13) extending radially and outwardly from the peripheral bolster portion (12). As shown, both lateral edges of the central support area (11) are cut separate from the corresponding lateral portions of the peripheral bolster portion (12), and the upper end of the same is connected by sewing with the upper part of the peripheral bolster portion (12): In other words, the central support area (11) is cut in the vertical boundary lines (a1)(a1) defined latterally thereof, except that its upper end is sewn to the upper part of the peripheral bolster portion (12) at a horizontal boundary line (a2) defined therebetween.

In each of the vertical boundary lines (a1)(a1), there is provided a clearance between the central support area (11) and the lateral portions of the peripheral bolster portion (12), thereby providing decorative deep grooves so as to accentuate a solididy touch of the seat back (A).

The central support area (11) further comprises the aforementioned upper back support portion (11b) and lumbar support portion (11a) in such a manner that the former (11b) has a pair of side skirt portions (11b-1) bent rearwardly and the latter (11a) also has a pair of side skirt portions (11a-1) bent likewise rearwardly, with those two paired side skirt portions (11b-1)(11a-1) being separate from each other at a incision (18).

Figure 3:
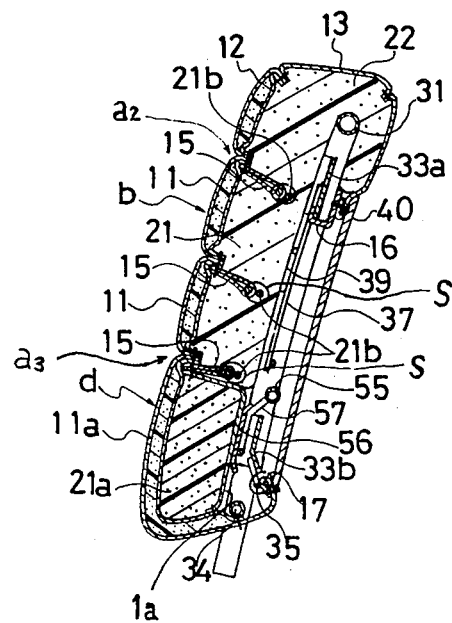
FIG. 3 is a sectional view taken along the line III—III in the FIG. 1.
Figure 5:
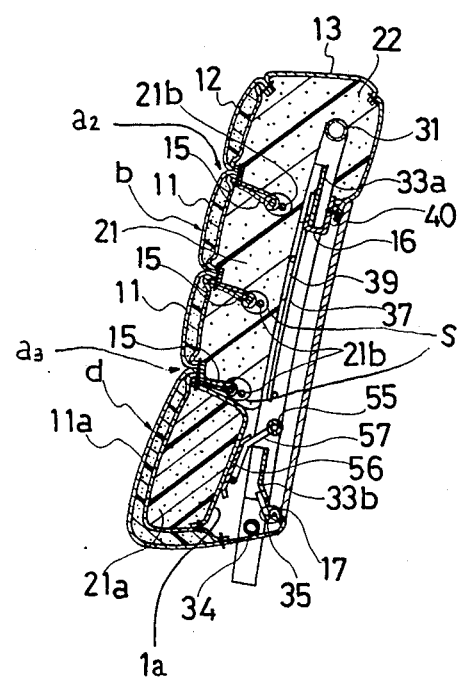
FIG. 5 is a sectional view taken along the line in the FIG. 1, which shows the state wherein, similarly to the FIG. 4, the lumbar plate is raised by the operation of the lumbar support device.
Figure 7:
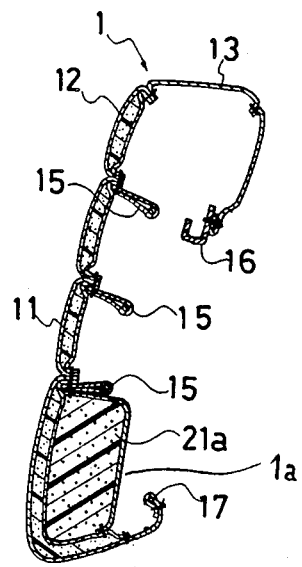
FIG. 7 is a sectional view of a trim cover assembly in accordance with the present invention, showing that a lumbar support cushion member is accommodated therein.

At the rear side of the lumbar support portion (11a), there is sewn a container member (1a) made from a suitable cloth, as can be seen from FIGS. 3 5, and 7. The container member (1a) is preferably of a bag-like form with an entry opening defined at one side for access to its interior so that the lumbar support cushion member (21a) may be easily accommodated therein during the assemblage of the seat. FIG. 7 depicts the lumbar support cushion (21a) to be placed within the container member (1a) in conjunction with the inner surface of the lumbar support portion (11a) of the trim cover assembly (1).

It is important to note that thus-constructed lumbar support section (d) of the seat back (A) is free to move forwardly and backwardly relative to the boundary (a3) between the central back support section (b) and lumbar support section (d), due to the provision of the independent lumbar support cushion member (21a) as well as the provision of the incision (18) which avoids the limitation of movability caused by an integral, continuous formation of all parts of trim cover assembly (1) and cushion member (2).

Further, to permit such free movability of the lumbar support section (d), the lower terminal part (17) of the lumbar support portion (11a) associated with the trim cover assembly (1) is formed somewhat long in a loose state, as can be seen in FIG. 3, allowing for the range of forward-and-backward movement of the lumbar support section (d). As shown, the extremity of such lower terminal part (17) is turned back and secured to a wire member (35) of the seat frame (31)

Although not shown clearly, there are arranged a plurality of anchoring cloth members (15) on the rear side of the trim cover assembly (1) such that some of them are disposed at the rear side of the upper back support portion (11b) as in FIG. 5, and the other of them are disposed at the rear side of the vertical and horizontal boundary lines (a1)(a2). These anchoring cloth members (15) are pulled in and secured via hog rings (S) to the respective wire members (21b) embedded in the cushion member (2) and to the respective wire members (36, 38) of the seat frame (31).

Figure 2:
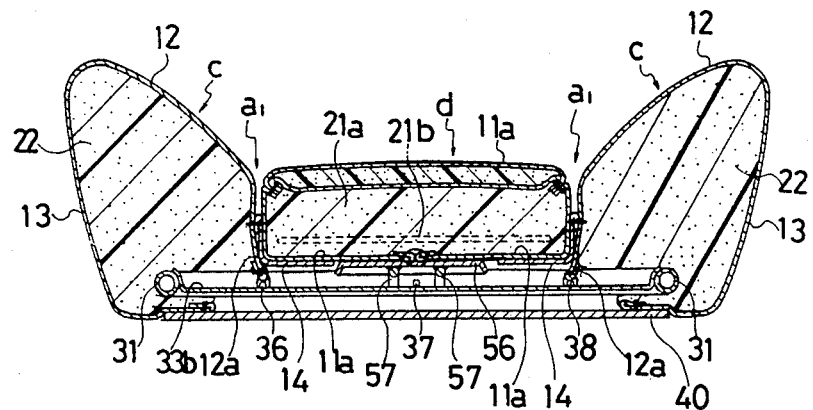
FIG. 2 is a sectional view taken along the line II—II in the FIG. 1.
Figure 4:
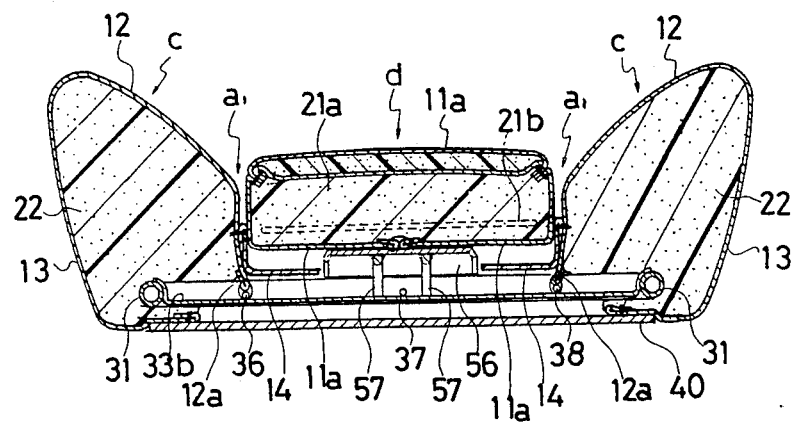
FIG. 4 is a sectional view taken along the line II—II in the FIG. 1, which shows the state wherein a lumbar plate is raised by the operation of a lumbar support device.

In this context, it is noted that the peripheral bolster portion (12) of the trim cover assembly (1) is secured at its inner edges (12a)(12a) to the wire members (36)(38) via hog rings (S), as in FIGS. 2 and 4.

Designations (14)(14) represent a pair of supplementary covering strips each being at its one end sewn to the respective inner edges (12a)(12a) of the peripheral bolster portion (12) with such an arrangement that their respective free ends extend under and inwardly of the lumbar support section (d) in a direction towards each other, substantially in parallel with the seat frame (3).

The supplementary covering strips (14)(14) therefore conceals the interior of the seat back (A) and a part of the seat frame (3) that may be exposed to view from the clearance in the vertical boundary lines (a1)(a1), and further advantageously serve to avoid the possibility of the fingers of an occupant on the seat, when accidentally caught in the clearance, being injured from the hard fittings in the interior of the seat back (A).

The side wall portion (13) of the trim cover assembly (1) is stretched over the lateral walls of the peripheral side portion (22) of the cushion member (2) and is secured at its edge portions (13a)(13a) to either the wire members (36)(38) as shown in FIG. 2, or the rear surface of the peripheral side portion (22), and also the upper edge portion (13b) of the side wall portion (13) is secured via a hook member (16) to the upper plate member (33a) of the seat frame (3) as in FIG. 3, the hook member (16) being sewn to the upper edge portion (13b) as best seen in FIG. 7.

Numeral (40) stands for a back board mounted on the rear side of the seat back (A) in a manner generally covering the whole area thereof.

Figure 6:
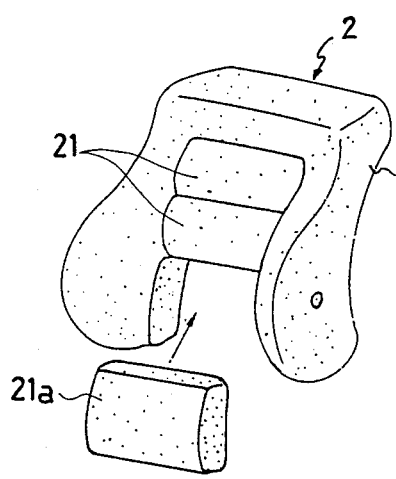
FIG. 6 is a perspective view of a cushion member in accordance with the present invention.

FIG. 6 shows the specific structure of the cushion member (2). As understandable from FIGS. 3 and 5, a plurality of the wire members (21b) are embedded in the central back support portion (21) of the cushion member (2), each of them being arranged in a given parallel relation in the height-wise direction of the back support portion (21) and extending transversely thereof. Although not shown, the cushion member (2) is formed with a plurality of recessed grooves adapted for insertion therein of the abovementioned anchoring cloth members (15), the recessed grooves extending down to the point adjacent to the wire members (21b), whereupon the anchoring cloth members (15) are secured via the hog rings (S) to the respective wire members (21b) (FIG. 3).

Figure 9:
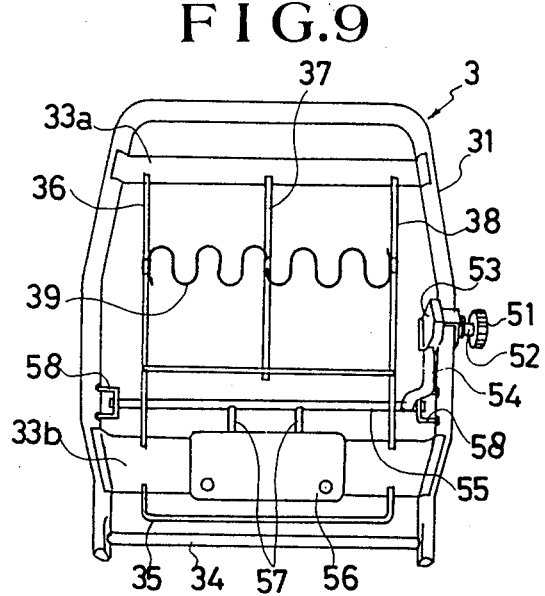
FIG. 9 is a perspective view of a frame work of the seat in accordance with the present invention.

FIG. 9 illustrates the seat frame (3) comprising a substantially inverted-U-shaped back frame (31), a lumbar support device (51, 52, 53, 54, 55, 56, 57, and 58) provided at the lower portion of the back frame (31), and a reinforcing rod (34) extended between both free end portions of the back frame (31). In that seat frame (3), the foregoing upper and lower plate members (33a)(33b) and wire members (35)(36)(38) are arranged as illustrated. The cushion member (2) is supported on thus-constructed frame (3) with the trim cover assembly (1) affixed thereover.

The lumbar support device is basically composed of a control knob (51), a control shaft (52) integral with the control knob (51), a cam (53) fixed on the shaft (52), the cam (53) having plural discrete cam surfaces thereon, a connecting rod (54) whose lower end is fixed on the operation shaft (55), and a lumbar plate (56) which is fixed via a pair of support rods (57) to the operation shaft (55), with the upper free end of the connecting rod (54) being in abutment against one of the plural discrete cam surfaces of the cam (53). Thus, when the control knob (51) is rotated under the condition that the lumbar plate (56) is in a retracted state as in FIGS. 2 and 3, the cam (53) is caused to rotate, changing its cam surface so as to cause the rotation of the operation shaft (55) to thereby transmit a forward rotation force to the lumbar plate (56) which is then displaced forwardly as shown in FIGS. 4 and 5. Accordingly, the lumbar support section (d) is pushed forwards by the lumbar plate and raised from the retracted state, whereby the lumbar part of an occupant on the seat is sufficiently supported by such lumbar support section (c) being projected.

It is to be understood from the above descriptions that the lumbar support section (d) is formed independently of other sections of the seat back (A) and is easy to move forwardly and backwardly without any obstruction, since both corresponding lumbar support cushion member (21a) and lumbar support portion (11a) of the trim cover assembly (1) are formed separate from the resepctive adjacent peripheral portions (22, 12). Accordingly, the following advantages are with the present invention:

(1) There is a far less amount of force required on the occupant side to actuate the lumbar support device, due to the smooth movability of the lumbar support section (d) laying on the lumbar suppot device.

(2) In contrast to the integral mass of prior art seats, the independent lumbar support section (d) in the present invention is displaced at a greater distance in the forward direction, so that the adjustment of the lumbar support section (d) can be effected in a wider range to match its lumbar support level to any individual occupant of different physique.

While the above description has been made of a preferred embodiment of the present invention, it should be understood that the invention is not limited to the illustrated embodiment, but any other replacements, modifications and additions may structurally be possible without departing from the scope and spirit of the appended claims for the invention.

What is claimed is:

1. A vehicle seat with a lumbar support device, comprising:
   a trim cover assembly having, defined therein a central back support portion and a peripheral bolster portion integrally circumscribing said central back support portion;
   said central back support portion having a lumbar support portion provided therein, said lumbar support portion being separated from said peripheral bolster portion;
   a cushion member covered with said trim cover assembly, said cushion member being provided with an independent lumbar support cushion member which is formed independently of said cushion member and covered with said lumbar support portion of said trim cover assembly; and
   a seat frame on which said lumbar support device is mounted, which lumbar support device includes a lumbar plate so arranged as to move forwardly and backwardly of said seat to thereby raise and lower said lumbar support cushion member.

2. The vehicle seat according to claim 1, wherein said lumbar support portion of said trim cover assembly is at its rear side provided with a container member, and wherein said independent lumbar support cushion member is accommodated in said container member.

3. A vehicle seat with a lumbar support device, comprising:
   a trim cover assembly having, defined therein a central back support portion and a peripheral bolster portion integrally circumscribing said central back support portion;
   said central back support portion having a lumbar support portion provided therein, said lumbar support portion being separate from said peripheral bolster portion;
   a cushion member covered with said trim cover assembly, said cushion member including:
      a central support portion;
      a peripheral side portion integrally circumscribing said central support portion; and
      an independent lumbar support cushion member formed independently of said central support portion and peripheral side portion; and
   a seat frame on which said lumbar support device is mounted, which lumbar support device includes a lumbar plate so arranged as to move forwardly and backwardly of said seat to thereby raise and lower said lumbar support cushion member.

4. The vehicle seat according to claim 3, wherein said lumbar support portion of said trim cover assembly is at its rear side provided with a container member, and wherein said independent lumbar support cushion member is accommodated in said container member.

5. The vehicle seat according to claim 3, wherein said trim cover assembly further comprises a side wall portion integrally circumscribing said peripheral bolster portion, said side wall portion being adapted to cover lateral walls of said cushion member, wherein both lateral portions of said central back support portion are separate from said peripheral bolster portion, and wherein said lumbar support portion is defined at a lower of said central back portion, which lumbar support portion is at its rear side provided with a container member which is adapted to accommodate therein said independent lumbar support cushion member.

6. The vehicle seat according to claim 1, wherein said peripheral bolster portion of said trim cover assembly has an edge portion disposed adjacent to said central back support portion of said trim cover assembly, said edge portion being secured to said seat frame, and wherein there is provided a supplementary covering strip at said edge portion of said peripheral bolster portion, said supplementary covering strip extending under said lumbar support cushion member, thereby preventing an interior of said seat from being exposed to view from a clearance between said central back support portion and said peripheral bolster portion.

7. The vehicle seat according to claim 3, wherein said peripheral bolster portion of said trim cover assembly has an edge portion disposed adjacent to said central back support portion of said trim cover assembly, said edge portion being secured to said seat frame, and wherein there is provided a supplementary covering strip at said edge portion of said peripheral bolster portion, said supplementary covering strip extending under said lumbar support cushion member, thereby preventing an interior of said seat from being exposed to view from a clearance between said central back support portion and said peripheral bolster portion.

* * * * *